Patented Jan. 6, 1942

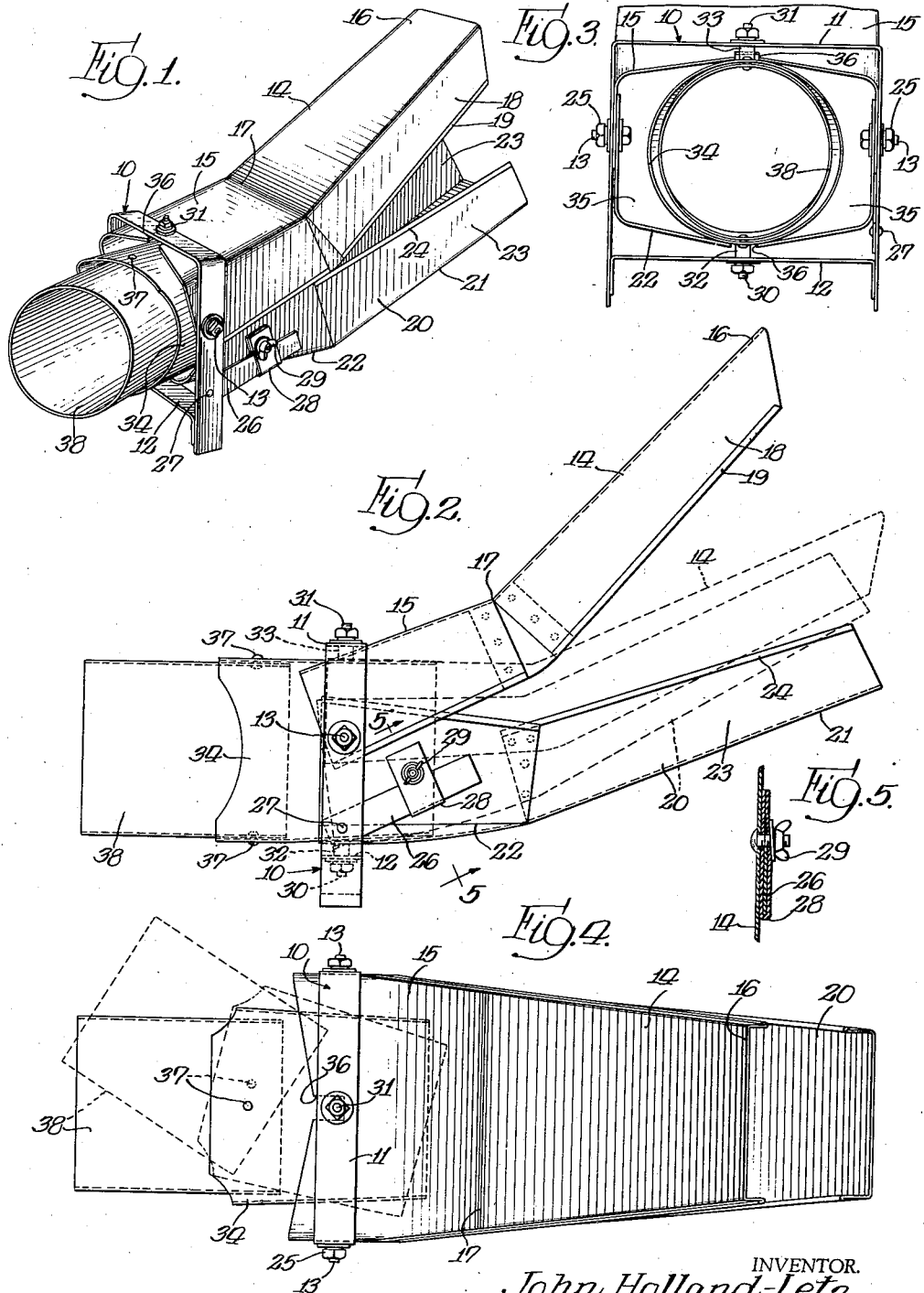

2,269,155

UNITED STATES PATENT OFFICE 2,269,155

ROUGHAGE MILL DISTRIBUTING SPOUT

John Holland-Letz, Crown Point, Ind., assignor to The Letz Manufacturing Company, a corporation of Indiana Application May 29, 1939, Serial No. 276,269

11 Claims. (Cl. 302—63)

The present invention relates generally to roughage mills, but more particularly to a novel and improved spout for discharging and distributing roughage or ground forage from a pneumatic conveyor for storage.

It has been found by experience that in the preparation and preservation of ground or partially ground roughage where a portion of the material comminuted is green or damp and another portion of the material is light and dry, it is very essential to the proper preservation of the forage that both the dry and green or damp material be properly intermixed in the piling or storing operation. In other words, if in the piling or discharging operation effected by the spout is such that the light or dry materials are separated from the green or damp materials, the green or damp materials will generate sufficient heat and in a short time will become sour or mouldy and therefore will be an unfit forage for cattle.

It is therefore, one of the primary objects of the present invention to provide a novel and improved distributing spout which is capable of a variety of adjustments so as to overcome the difficulties hereinbefore pointed out and eliminate to a maximum degree the separation of the lighter or dry particles from those of the green or damp particles in order to make a preservative forage product.

A further object of the invention is to provide a novel and improved discharge spout which may be adjusted to a variety of positions so as to reduce to a minimum the air pressure adjacent the mouth of the spout and at the same time reduce the velocity of the discharging materials and thereby prevent to a considerable degree the separation of the lighter or dry particles from those of the heavier or green particles.

These and other objects are accomplished by providing a construction and an arrangement of the various parts in the manner hereinafter described and particularly pointed out in the appended claims.

Referring to the drawing:

Fig. 1 is a perspective view of my improved distributing spout;

Fig. 2 is an enlarged side elevational view showing the manner in which the upper and lower hoods of the spout may be adjusted from their maximum closed position to their maximum open position;

Fig. 3 is an end elevational view of the distributing spout;

Fig. 4 is a top plan of the hood shown in Fig. 1; and

Fig. 5 is a fragmentary cross sectional view taken on the line 5—5 in Fig. 2 of the drawing.

In illustrating one form of my improved distributing spout, I have shown the same as comprising a supporting frame or stand generally indicated by the reference character 10. This supporting stand comprises a substantially rectangular inverted U-shaped member 11 made of flat steel with its lower ends or leg portions secured together by transverse supplemental frame member 12. Pivotally connected to aligned and oppositely disposed pivot bolts 13 on the vertical side members of the U-shaped frame 11, is an upper hood or channel shaped member 14 of my distributing spout. The hood 14 is wider as shown at 15 at its inner end so as to be substantially the width of the supporting frame 11 and gradually tapers toward the outer or extreme end as shown at 16. An intermediate portion on the hood 14 is bent as shown at 17 so that the outer portion is inclined upwardly with respect to that portion attached to the frame 11. The opposite flanged sides as shown at 18 have their lower edges rolled into bead-like formation as shown at 19 to reinforce and strengthen the hood. Pivotally mounted on the same bolts 13 is a lower or bottom hood 20 of channel-like cross section which has its outer portion inclined upwardly as shown at 21 with respect to its inner portion as shown at 22. This lower hood 20 has its opposite sides 23 terminating in rolled beads 24 at the upper edges thereof for the purpose of reinforcing and strengthening the lower hood. The lower hood 20 has its inner end located within the inner end of the upper hood 14 so that the lower hood 20 telescopes almost wholly within the upper hood so as to adjust the capacity of the mouth of the hood when both hoods are adjusted to various positions for example as is shown in broken lines in Fig. 2 of the drawing. The two hoods 14 and 20 are locked in relative position with respect to each other by nuts 25 mounted in threaded engagement with each of the opposite bolts 13 on the frame 11. The lower hood 20 is further secured in its adjusted position by a link 26 pivoted at 27 to one of the sides of the frame member 10 and has its outer free end slidably engaging a clamping strap 28 which in turn is pivotally secured by a bolt and thumb nut 29 to one side of the hood 20. Pivotally mounted on oppositely disposed pivot bolts 30 and 31 and spacer sleeves 32 and 33 to each of the horizontal frame portions 11 and 12 is a conically shaped and relatively short conduit or connection 34. By reason of the enlarged shape of the inner end of the distributing spout which is substantially rectangular in cross section while the conduit 34 is circular, substantial air spaces or openings as shown at 35, are provided between these connecting parts so as to permit the dissipation of air pressure rearwardly of the spout. These openings reduce the velocity of the incoming material and thereby prevent the separation of the light and dryer materials from the wet, green or heavier materials. The inner ends of the upper and lower hoods 14 and 20 are provided with longitudinal slots as shown at 36 so as to permit the hoods to be adjusted on their pivots 13 without interference from the spacer tubes 33. Pivotally connected to the exposed end of the conically shaped conduit 34 as shown at 37 is cylindrical conduit connection 38. These vertically extending pivotal connections 37 permit the discharge spout to be angularly disposed at relatively extreme angles with respect to the main conduit connected with the roughage mill so that a wide range of distribution of the materials within the mow or hayloft may be had in properly distributing the material for storage purposes.

Summarizing the function and advantages of operation of my improved distributing spout, it will be readily seen that by arranging the entrance of the hood so that the area thereof is substantially greater than that of the conduit leading thereinto, relatively large openings are provided rearwardly of the discharge spout so as to dissipate the air pressure and thereby reduce the velocity of the discharged material. In so doing, the lighter and heavier materials remain in their properly mixed state which when piled in the mow enhances the preservative quality, thereby eliminating spoilage such as has been experienced with forage heretofore stored by the conventional type of spout.

It will also be noted that by arranging the spout in two forms of telescoping hoods, the adjustment of the hoods with respect to one another may be secured so that the desired effect, namely that of eliminating the separation of the light, dry materials from the heavier, wet or green materials is overcome. As shown in the drawing, and particularly Fig. 2 thereof, the hoods 14 and 20 may be adjusted from the closed position as shown in the broken lines to the extreme opened position shown in full line, permitting the materials to be discharged at elevated or low position with a wide range of adjustments permitting dissipation of the air pressure so as to prevent separation as hereinbefore described.

While in the above specification I have described one embodiment which my invention may assume in practice, it will of course be understood that the same is capable of modification and that modification may be made without departing from the spirit and scope of the invention as expressed in the following claims.

What I claim is my invention and desire to secure by Letters Patent is:

1. A material distributing spout comprising a supporting frame, chute-like members pivotally connected to said frame, and a conduit pivoted to said frame on an axis at right angles to the pivotal axis of said first named members.

2. A spout for distributing material comprising a chute in the form of two pivotally adjustable members, said members having their discharge ends of relatively smaller area than their receiving ends, and a conduit pivotally adjustable on an axis at right angles to the pivot of said members and connected to the receiving end of said chute.

3. A material discharging spout comprising a supporting frame, separate discharge spout members pivotally connected to said frame, said members having a constricted area towards their discharge ends, and a conduit of relatively smaller area pivotally connected to said frame and communicating with the receiving end of said spout.

4. A material distributing spout comprising a supporting frame, channel-like hoods pivoted to said frame and adapted to telescopically engage one another, and a conduit pivotally connected to said frame and communicating with the receiving end of said spout.

5. A material distributing spout comprising two oppositely disposed adjustable and longitudinally extending channel-like members, said members being pivotally connected directly together at one end and telescopically engaging one another at the other end, the telescopic end of said members having constricted areas toward the discharge end thereof, and a conduit connected to the receiving end of said members of considerably smaller area than the adjacent end of said spout.

6. A material distributing spout comprising two longitudinally extending channel-like members adapted to telescopically engage one another, means for pivotally connecting one end of said members together, said members having a constricted area at one end thereof, and a conduit pivotally connected at the other end thereof of substantially smaller area than the communicating end of said spout.

7. A material distributing spout comprising a substantially rectangular supporting frame, two longitudinally extending channel-like telescoping members pivotally secured to said frame whereby the discharge end of said members may be adjusted with respect to one another for varying the area thereof, and a conduit pivotally connected to said frame and communicating with the receiving end of said spout.

8. A material distributing spout comprising longitudinally extending and oppositely disposed chute-like members of substantially rectangular cross-section, said members being pivotally connected so that their free ends telescopically engage one another, means for adjusting the discharge ends of said members for constricting or enlarging the discharge end of said chute, and a conduit pivotally connected to the receiving ends of said members and adjustable with respect thereto.

9. A material distributing spout comprising an upper hood member of channel-like cross section having its outer end bent upwardly with respect to it inner end, a second hood member of channel-like cross section, having its outer end bent upwardly with respect to its inner end and adapted to telescopically engage said first hood member, a frame for pivotally supporting said hood members in various positions of adjustment, and a conduit pivoted on a vertical axis on said frame and communicating with the receiving end of said hood.

10. A material distributing spout comprising a substantially rectangular frame, longitudinally extending and angularly disposed channel-like members having their opposite sides pivotally attached to the sides of said supporting frame, means for securing one of said members in adjusted position with respect to the other for varying the discharge area, and a conduit mounted on vertical pivots on said frame and communicating with the receiving end of said spout.

11. A material distributing spout comprising a supporting frame, chute-like members pivotally connected to said frame, and a conduit pivoted to said frame on an axis at right angles to the pivotal axis of said first named members, the axes of all of said pivots occupying a single transverse plane.

JOHN HOLLAND-LETZ.